Patented Nov. 7, 1939

2,178,680

UNITED STATES PATENT OFFICE 2,178,680

EXPANDER FOR STORAGE BATTERIES AND METHOD OF MAKING THE SAME

Robert A. Daily, Muncie, Ind., assignor to General Motors Corporation, Detroit, Mich., a corporation of Delaware No Drawing. Application November 15, 1937, Serial No. 174,657

10 Claims. (Cl. 136—26)

This invention relates to the manufacture of storage batteries and more particularly to storage batteries for automotive vehicles.

It is an object of the invention to provide an improved expander for the storage battery paste. It is understood that one function of an expander is to prevent the capacity of the battery falling off with repeated use, and thus producing longer life. Another function of the expander in storage battery paste is to lower the counter E. M. F. of the battery so that the charging voltage will have a maximum which is a safe voltage for the electrical system of an automotive vehicle.

Certain inorganic nickel compounds have been proved to be useful as storage battery expander. For example, Chamberlain Patent No. 1,944,065, granted January 16, 1934, discloses a storage battery plate of the pasted lead type adapted for use in a sulphuric acid electrolyte having active material incorporating between .9 and 1.5% of nickelous sulphate.

More specifically it is an object of the present invention to provide a satisfactory expander with the use of a much smaller proportion of inorganic nickel compound than heretofore used in the preparation of an expander. According to the present invention, satisfactory results have been obtained when using nickelous phosphate in the proportion of ¼% of the weight of the active material of the plate, and best results when using only ½%.

The inorganic nickelous compound is not mixed directly with the paste as taught by Chamberlain, but is incorporated with another material which also acts as an expander. This material is usually a sulphonated lignin compound made from various kinds of wood which have been sulphonated and have had the cellulose substantially removed therefrom. One of such material which is inexpensive and easily obtained is commercially known as waste sulfite liquor in concentrated form from paper mills. This liquor is of molasses-like consistency and is a water solution concentrated to about 50% of water. In the manufacture of paper, wood fibers are treated with calcium bisulphite which does not dissolve the cellulose matter, but dissolves the non-cellulosic part called "lignin." Calcium bisulphite unites with lignin and is believed to cause a sulphonization of lignin, meaning that the acid radical attaches itself to the organic matter of the lignin, causing the insoluble matter to become soluble. This waste sulfite liquor is believed to be a calcium compound of sulphonated lignin. The calcium content is approximately 2.5%, and this content is fairly uniform. The sulphonated lignin compound may be further purified if desired by the removal of impurities in the solution. However, this is not entirely necessary to the success of the invention.

According to the process of the present invention, nickel is substituted for the calcium of the waste sulfite liquor by adding the liquor to a solution of nickel phosphate, $Ni_3(PO_4)_2$. The amount of nickel phosphate is determined by determining the amount of nickel required to replace the calcium in a given amount of liquor. The nickel phosphate crystals are weighed out and a sufficient amount of water is added to dissolve them. Sufficient sulphuric acid is added to slightly acidify the solution, waste sulfite liquor being slightly alkaline. Nickel takes the place of calcium to form a nickel compound of sulphonated lignin, which is water soluble. The replaced calcium unites with the $(PO_4)_2$ to form calcium phosphate, $CaH(PO_4)_2$, which is insoluble and precipitates. The nickel compound may be filtered off; but, as a practical matter, the solution together with the calcium phosphate precipitate may be used without filtering. Apparently, it does no harm to permit the calcium compound to enter into the paste. Probably calcium combines with sulphuric acid when making the paste and phosphoric acid is liberated.

The nickel compound of sulphonated lignin, filtered or unfiltered, is added to the paste mix at the time water is added to the lead oxide of the paste. Sulphuric acid is added after adding water. Paste provided with the expander made according to the present invention is highly desirable for the paste of negative plates of the storage battery. A suitable paste for negative plates may be made of 100 parts of litharge, PbO, .6 part of the expander made according to the present invention and sufficient sulphuric acid to sulphate the contents to the extent of producing 12% of lead sulphate. The desired degree of plasticity is obtained by adding correct amounts of water.

The advantages of using a nickel compound of sulphonated lignin in the paste of a negative plate are two-fold. First, this compound functions as an expander causing the active material, sponge lead, to expand after cycling as much as 15%. The nature of this expansion is not exactly understood, but it is believed to be the reverse of coalescing. The particles of sponge lead, though they may become smaller, apparently become separated. The degree of expansion is such that the plate may increase as much as 15% in thickness. This expander has the usual function of preventing the capacity of storage batteries from decreasing with repeated use, thereby producing longer life of the battery. The plates provided with the expander are usually the negative plates of the battery. It has been found that a battery plate with no expander is not as efficient at the start of the cycle, especially at low temperature, as plates which have been provided with an expander. (Efficiency is the measure of ability of the battery to discharge its current.)

Another function of the nickel compound of sulphonated lignin is to reduce the counter E. M. F. of the battery. The reduction has been as much as .3 volt per cell at 0° F., and .2 volt per cell at 80° F. This means that the charging voltage of the battery has been reduced from approximately 9 to approximately 8 volts at 0° F. resulting in reduction of voltage to 8 volts as applied to the lamps of an automobile.

The same desired reaction with waste sulphite liquor that is obtained with nickel phosphate may be obtained by using nickel sulphate and tri-sodium phosphate; and also by using nickel oxide and the tri-sodium phosphate. The procedure is the same as for nickel phosphate.

What is claimed is as follows:

1. The method of preparing paste for storage battery plates which consists of adding water to the lead compound to form a paste, and in then adding a nickel salt of sulphonated lignin, and sulphuric acid.

2. The method of preparing paste for storage battery plates which consists in treating waste sulphite liquor with nickel phosphate and adding the reaction products of such treatment to the lead compound at the time water is added thereto and then adding sulphuric acid to complete the paste.

3. A paste for negative plates of storage batteries comprising litharge combined with sulphuric acid and with the reaction products of waste sulphite liquor and nickel phosphate.

4. A paste for the negative plates of storage batteries comprising 100 parts of litharge, .6 part of an expander which includes the reaction products of nickel phosphate and a waste sulphite liquor and sufficient sulphuric acid to sulphate the contents to the extent of producing 12% of lead sulphate.

5. The step in the process of preparing an expander for storage battery plate paste which consists in treating waste sulphite liquor with nickel phosphate in order to form a nickel salt of a sulphonated lignin compound and a precipitate of calcium phosphate.

6. A storage battery plate of the pasted lead type adapted for use in a sulphuric acid electrolyte, having active material incorporating therein the reaction products of an inorganic nickel salt and a sulphonated lignin salt, said nickel salt being in the proportions of between .25 of a percent and .50 of a percent by weight of the active material of the plate.

7. An expander for the addition to the paste of storage battery plates, a nickel salt of sulphonated lignin.

8. An expander for the addition to the paste of storage battery plates, the reaction products of nickel phosphate and waste sulphite liquor.

9. An expander for the addition of the paste of storage battery plates, the reaction products of waste sulphite liquor, a nickel salt and tri-sodium phosphate.

10. An expander for the addition to the paste of storage battery plates, comprising a mixture of a nickel salt of sulphonated lignin and calcium phosphate.

ROBERT A. DAILY.